(12) United States Patent
Ebbenga et al.

(10) Patent No.: US 12,077,025 B2
(45) Date of Patent: Sep. 3, 2024

(54) BRACKET FOR PROVIDING A PIVOTING JOINT

(71) Applicants: Mark Ebbenga, Shafer, MN (US); Dana Hallberg, Forest Lake, MN (US)

(72) Inventors: Mark Ebbenga, Shafer, MN (US); Dana Hallberg, Forest Lake, MN (US)

( * ) Notice: Subject to any disclaimer, the term of this patent is extended or adjusted under 35 U.S.C. 154(b) by 736 days.

(21) Appl. No.: 17/191,986

(22) Filed: Mar. 4, 2021

(65) Prior Publication Data

US 2021/0276381 A1 Sep. 9, 2021

Related U.S. Application Data

(60) Provisional application No. 62/985,200, filed on Mar. 4, 2020.

(51) Int. Cl.
*B60D 1/42* (2006.01)
*F16C 11/04* (2006.01)

(52) U.S. Cl.
CPC .............. *B60D 1/42* (2013.01); *F16C 11/04* (2013.01)

(58) Field of Classification Search
CPC ...... B60D 1/42; B60D 1/54; B60D 2001/544; F16C 11/00; F16C 11/04
See application file for complete search history.

(56) References Cited

U.S. PATENT DOCUMENTS

| | | | |
|---|---|---|---|
| 4,398,742 A * | 8/1983 | Sanders | B60D 1/54 403/53 |
| 5,445,355 A * | 8/1995 | Chen | H01Q 1/088 343/715 |
| 5,503,423 A | 4/1996 | Roberts et al. | |
| 5,890,617 A * | 4/1999 | Rowland | B60D 1/155 280/479.2 |
| 7,232,099 B1 * | 6/2007 | Wilcox | B63B 25/002 248/231.91 |
| 7,237,791 B1 * | 7/2007 | Stettler | B60D 1/155 280/491.4 |

(Continued)

FOREIGN PATENT DOCUMENTS

CN 204870404 U 12/2016

OTHER PUBLICATIONS

International Search Report and Written Opinion issued for PCT/US2021/020802, dated May 20, 2021.

*Primary Examiner* — Tony H Winner
(74) *Attorney, Agent, or Firm* — Z. Peter Sawicki; Amanda M. Prose; Westman, Champlin & Koehler, P.A.

(57) ABSTRACT

A bracket and method for providing a pivoting joint to a trailer tongue where the bracket has a first surface having a plurality of first apertures therein and a second surface having a plurality of second apertures therein wherein the first surface and the second surface are connected by a 90 degree bend and wherein one or more of the plurality of first apertures are configured to receive a pivot pin therethrough and one or more of the plurality of first apertures are configured to receive a pivot position securing mechanism therethrough and where the bracket can further have a third surface having a plurality of third apertures therein wherein a second 90 degree bend integrally connects the third surface to the second surface and wherein the plurality of third apertures are spaced apart on the third surface to align with one or more of the plurality of first apertures.

9 Claims, 6 Drawing Sheets

(56) References Cited

U.S. PATENT DOCUMENTS

| | | | | |
|---|---|---|---|---|
| D554,029 S * | 10/2007 | Roll | ............................ | D12/162 |
| 7,484,147 B2 * | 1/2009 | Sumino | .................. | G11C 29/24 |
| | | | | 714/724 |
| 7,527,281 B1 * | 5/2009 | Rowland | ................ | B60D 1/155 |
| | | | | 280/491.4 |
| 7,731,219 B2 * | 6/2010 | Okerlund | ............... | B60D 1/155 |
| | | | | 280/491.1 |
| 7,753,395 B2 * | 7/2010 | Goettker | .................. | B60D 1/54 |
| | | | | 280/491.4 |
| 2005/0225053 A1 * | 10/2005 | Roll | ....................... | B60D 1/155 |
| | | | | 280/422 |

\* cited by examiner

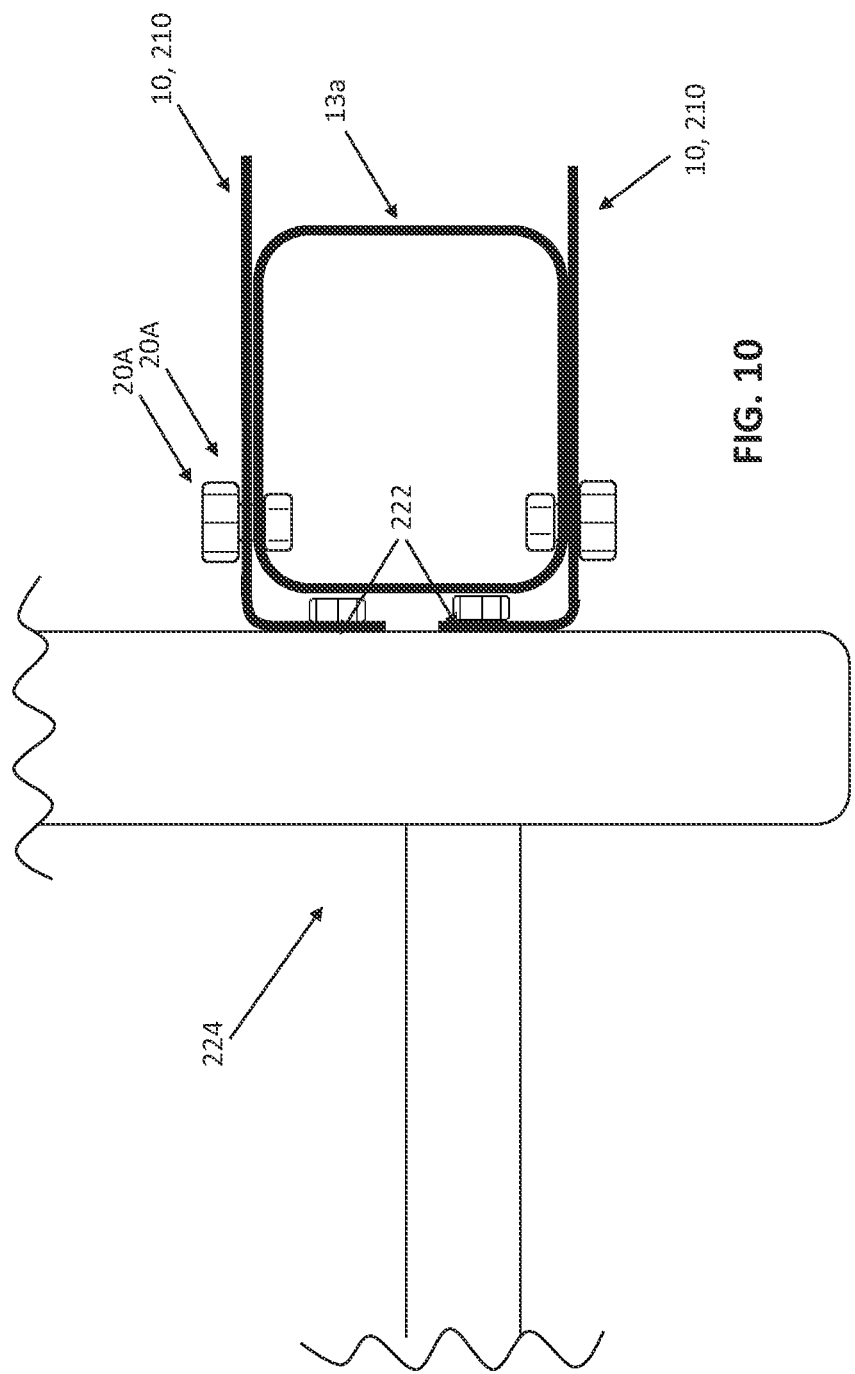

BRACKET FOR PROVIDING A PIVOTING JOINT

CROSS-REFERENCE TO RELATED APPLICATION

This application claims the benefit of and priority to U.S. provisional application Ser. No. 62/985,200, filed Mar. 4, 2020, the contents of which are incorporated herein in their entirety.

BACKGROUND

The present invention relates a bracket for providing a pivoting joint to a trailer tongue and for optionally securing accessories to the trailer tongue.

A trailer tongue keeps a trailer attached and at a distance from the tow vehicle. The tongue keeps the trailer in balance when towing and assists in keep weight on the tow hitch which is required for controlled towing. The tongue is generally a fixed length that is sufficient to keep the trailer and any watercraft or other equipment towed on the trailer a specific distance from the rear end of the tow vehicle. This means generally that the overall length of the trailer is long, especially for larger watercraft. Trailers for larger or longer watercraft generally do not fit within the depth of a garage, in that the tongue adds a length preventing inside storage of the trailer.

SUMMARY

An aspect of the present disclosure relates to a bracket for providing a pivoting joint to a trailer tongue. This allows for the selective positioning of the pivoting joint and thus allowing for the temporary shortening of the length of the trailer tongue and/or allowing for the pivoting connection of a marine accessory attachment to the trailer tongue, which may also allow for storage and use positions of the marine accessory in a compact or extended position set by the pivoting joint.

In one or more embodiments, the bracket has a first surface having a plurality of first apertures therein and a second surface having a plurality of second apertures therein wherein the first surface and the second surface are connected by a 90 degree bend and wherein one or more of the plurality of first apertures are configured to receive a pivot pin therethrough and one or more of the plurality of first apertures are configured to receive a pivot position securing mechanism therethrough.

In another aspect of the present disclosure the bracket has a third surface having a plurality of third apertures therein wherein a second 90 degree bend integrally connects the third surface to the second surface and wherein the plurality of third apertures are spaced apart on the third surface to align with one or more of the plurality of first apertures.

The bracket, wherein alone or in combination with a second bracket of identical construction, is configured for a marine accessory to be secured to the second surface or second surfaces and thus secured to the pivoting joint and wherein the marine accessory may be a stair.

Another aspect of the present disclosure relates to a system for providing a pivoting joint to a trailer tongue to selectively reduce to the overall length of the trailer tongue having one or more brackets having a first surface having a plurality of first apertures therein and a second surface having a plurality of second apertures therein wherein the first surface and the second surface are connected by a 90 degree bend and wherein one or more of the plurality of first apertures are configured to receive a pivot pin therethrough and one or more of the plurality of first apertures are configured to receive a pivot position securing mechanism therethrough. A coupling component can be provided for securing to a first section of trailer tongue and wherein the one or more brackets pivotally secure the first section of the trailer tongue to a second section of trailer tongue and wherein the coupling component has one or more apertures for aligning with one or more of the first apertures of the bracket.

In yet another aspect of the present disclosure, the bracket further includes a third surface having a plurality of third apertures therein wherein a second 90 degree bend integrally connects the third surface to the second surface and wherein the plurality of third apertures are spaced apart on the third surface to align with one or more of the plurality of first apertures.

Another aspect of the present disclosure relates to a method for providing a pivoting joint to a trailer tongue to selectively reduce to the overall length of the trailer tongue by providing one or more brackets having a first surface having a plurality of first apertures therein and a second surface having a plurality of second apertures therein wherein the first surface and the second surface are connected by a 90 degree bend and wherein one or more of the plurality of first apertures are configured to receive a pivot pin therethrough and one or more of the plurality of first apertures are configured to receive a pivot position securing mechanism therethrough. A coupling component is provided for securing to a first section of trailer tongue and wherein the one or more brackets pivotally secure the first section of the trailer tongue to a second section of trailer tongue and wherein the coupling component has one or more apertures for aligning with one or more of the first apertures of the bracket.

In an aspect of the present disclosure, the bracket has a third surface having a plurality of third apertures therein wherein a second 90 degree bend integrally connects the third surface to the second surface and wherein the plurality of third apertures are spaced apart on the third surface to align with one or more of the plurality of first apertures.

The method can further include modifying a trailer tongue by separating the tongue into two sections for insertion of the pivoting joint therebetween.

The method can further include providing two brackets and two coupling components for providing the pivoting joint to the trailer tongue.

Providing the pivoting connection includes separating the tongue into two sections and installing one of the two brackets on a top surface of a first section of the trailer tongue and the second of the two brackets on a bottom surface of the first section of the trailer tongue as well as installing one of the two coupling components on a top surface of a second section of the trailer tongue and the second of the two coupling components on a bottom surface of the second section of the trailer tongue. The pivoting connection is provided by way of connecting at least one of the two brackets to at least one of the two coupling components with a pivot pin.

BRIEF DESCRIPTION OF THE DRAWINGS

FIG. 10 illustrates a pivoting joint between a trailer tongue and a marine accessory.

DETAILED DESCRIPTION

A bracket according to the present disclosure is configured to provide a pivoting joint along a length of a trailer tongue. The bracket is connectable to a tongue of a trailer and can be used to form a swing tongue portion of the boat trailer. Moreover, the bracket may optionally be connectable to an accessory for also mounting the accessory to a trailer.

The bracket described herein can be used for providing a pivoting joint for a trailer tongue where the trailer may be a boat trailer. The pivoting joint is provided along a length of the trailer tongue to form what can be considered a "swing tongue." That is, the bracket forms a pivotal or swing joint on a length of the tongue for connecting the trailer to a hitch or vehicle for towing. The bracket joins two length of the tongue so that the overall length of the tongue can be selectively reduced. When pivoted, a terminal length of the tongue can be folded or "swung" towards the bed portion of the trailer, thus effectively shortening the overall length of the trailer by reducing the length of the tongue. This allows for storage of the trailer in smaller areas such as garages. The terminal length of the tongue can then be swung back out into a position substantially parallel with a proximal length of the tongue and secured in such a position for towing or other trailer use. Thus, the bracket allows for selective shortening of the overall length of the trailer tongue and selective lengthening of the trailer tongue via pivotal connection of the two adjacent lengths of the trailer tongue.

The bracket described herein can be provided in one or more configurations for use with various size trailers, and in one configuration, can be considered a universal bracket for providing a swing joint or pivoting joint along any size trailer tongue. One or more brackets may be used cooperatively to provide the pivoting joint along the trailer tongue. In some embodiments two brackets cooperate to form the pivoting joint along the trailer tongue.

The brackets may be monolithic brackets of unitary construction. In some instances, two brackets of identical construction are provided for providing a pivotal joint to substantially any size trailer tongue.

Figure 1:
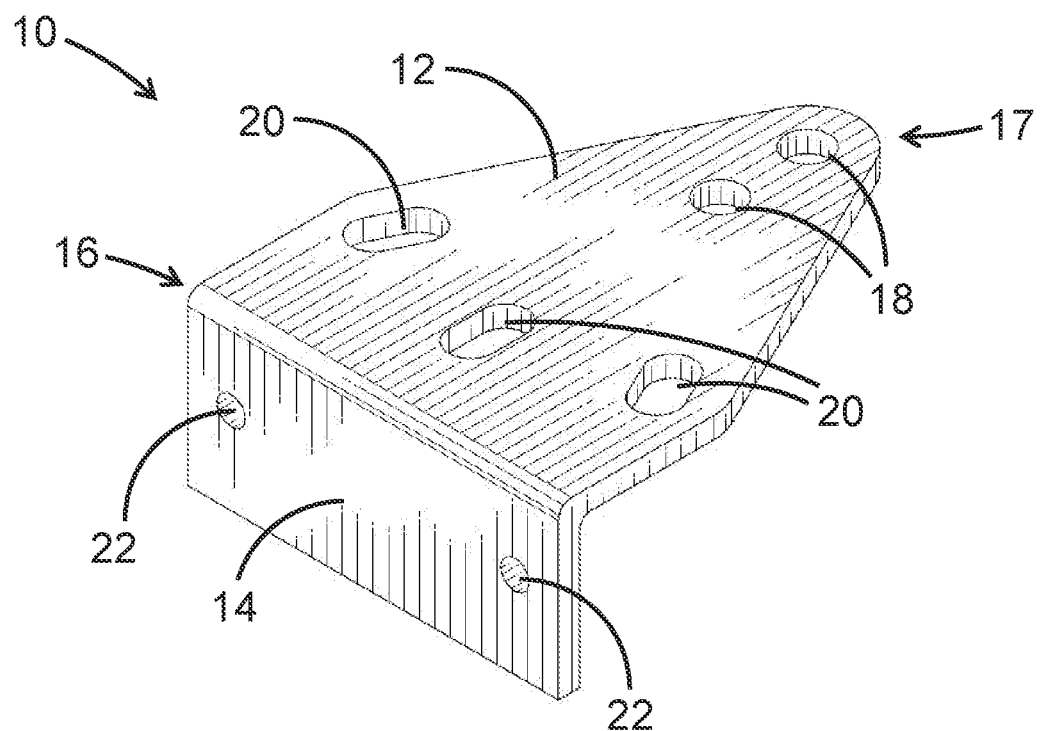
FIG. 1 is a rear perspective view of a bracket for providing a pivoting joint to a trailer tongue.
Figure 2:
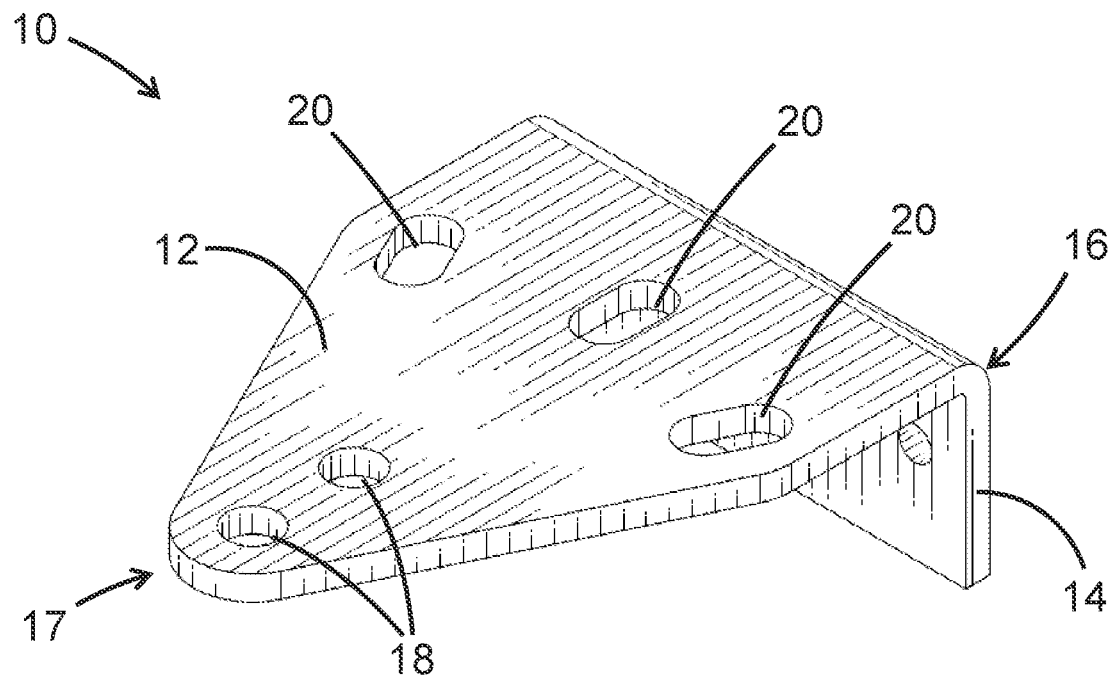
FIG. 2 is a front perspective view of the bracket illustrated in FIG. 1.
Figure 3:
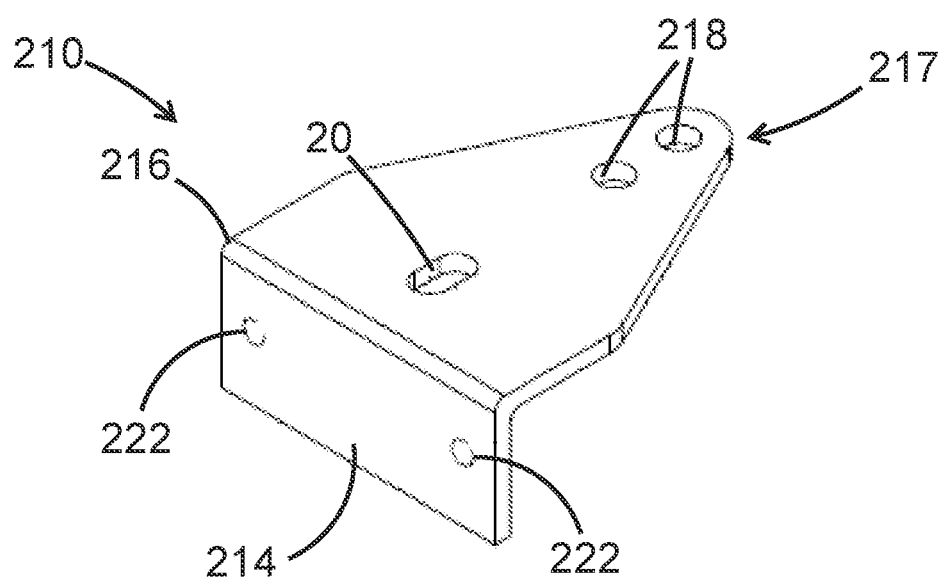
FIG. 3 is a perspective view of an additional embodiment of a bracket for providing a pivoting joint to a trailer tongue.

Referring to FIGS. 1-2, a bracket 10 having dimensions such that the bracket 10 is a universal bracket 10 is illustrated. For example, when bracket 10 is provided in pairs of two, the brackets 10 of identical construction are used to pivotally secure any trailer tongue to any trailer. In such an embodiment, a first bracket 10 in the pair is mounted on a first side such as a top side of the trailer tongue and a second bracket 10 in the pair is mounted on an opposing side of the assembly such as a bottom side of the trailer tongue. Such a bracket 10 allows for adjustable mounting of devices on any trailer tongue.

In further detail as illustrated in FIGS. 1 and 2, the bracket 10 comprises a first side 12 and a second side 14 where the first side 12 and second side 14 are connected by a bend 16 which may be a 90 degree bend 16. The first side 12 has one or more pivot apertures 18 therein and one or more securing apertures 20 therein. The second side 14 has one or more mounting apertures 22 therein. The one or more pivot apertures 18 and securing apertures 20 are positioned for mounting of the bracket to pivotally secure two sections of a trailer tongue and/or a trailer frame to a trailer tongue. The one or more pivoting aperture 18 positioning allows for selection of one or more apertures 18 for receiving a pivot pin 18A there through, the apertures used are selected based in part on the dimensions of the trailer tongue. The mounting apertures 20 are positioned to also allow for selection of an aperture 20 for receiving a fastener 20A there through and the aperture selected 20 in part on the dimensions of the trailer and tongue.

The first side 12 may have a rectangular surface area extending from the bend 16 which tapers to an apex 17 at the terminal end of the side 12. The second side 14 is rectangular as it extends away from the bend 16. The first side 12 and second side 14 also have different lengths extending away from the connection point or bend 16.

Figure 4:
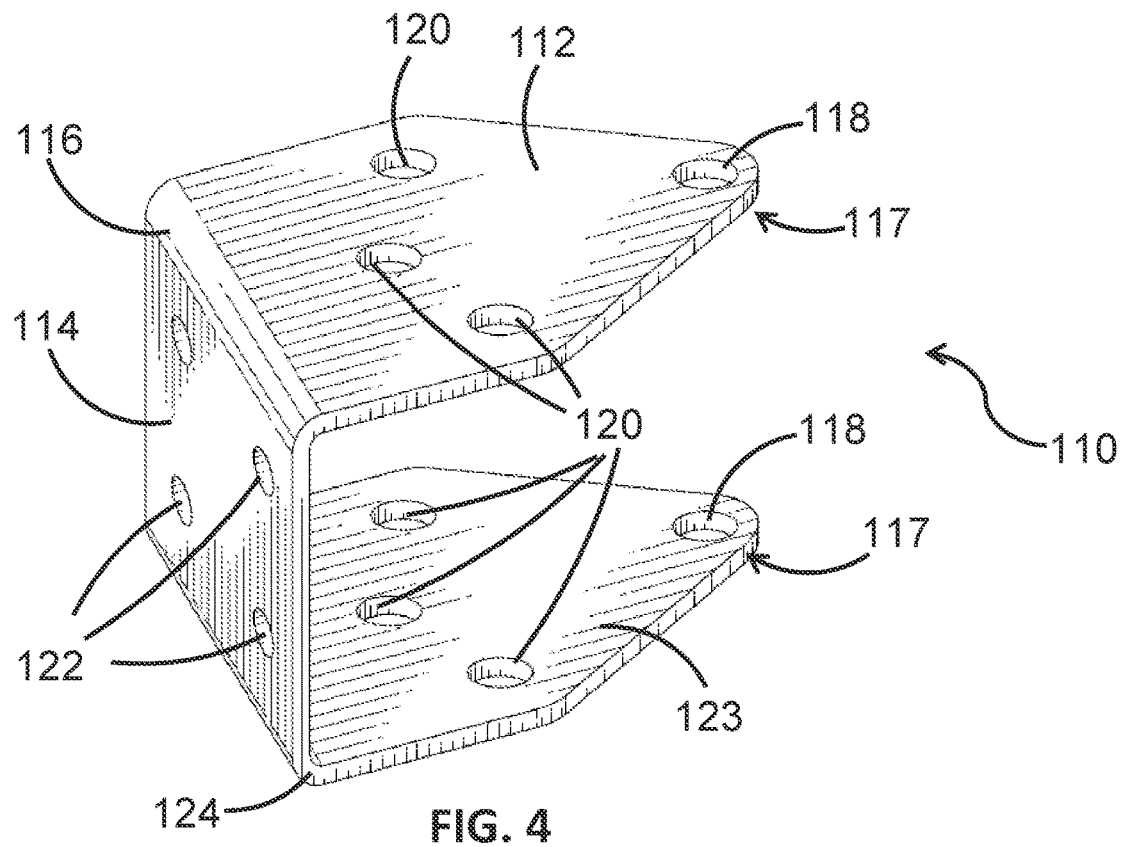
FIG. 4 is a rear perspective view of another additional embodiment of a bracket for providing a pivoting joint to a trailer tongue.

In further detail as illustrated in FIG. 4, a bracket 210 comprises a first side 212 and a second side 214 where the first side 212 and second side 214 are connected by a bend 216 which may be a 90 degree bend 216. In one or more embodiments described herein, the first side may have a length that is about 2.75 to about 3 times as long as the second side. The first side 212 has one or more pivot apertures 218 therein and one securing aperture 220 therein. The second side 214 has one or more mounting apertures 222 therein for mounting one or more accessories 2224 thereto as shown in FIG. 10. The one or more pivot apertures 218 and securing aperture 220 are positioned for mounting of the bracket to pivotally secure two sections of a trailer tongue and/or a trailer frame to a trailer tongue. One or more brackets 210 can be adjustably mounted to the trailer tongue and additional devices can be mounted to the trailer tongue via connection to the same bracket. The brackets 10 and 210 are of similar construction in that the distance between two brackets 10, 210 in a pair of brackets is adjustable when mounting or installing. The one or more pivoting aperture 218 positioning allows for selection of one or more apertures 218 for receiving a pivot pin there through, the apertures used are selected based in part on the dimensions of the trailer tongue. The mounting aperture 220 is positioned to receive a fastener there through.

The first side 212 may have a rectangular surface area extending from the bend 216 which tapers to an apex 217 at the terminal end of the side 212. The second side 214 is rectangular as it extends away from the bend 216. The first side 212 and second side 214 may also have different lengths extending away from the connection point or bend 216.

The bracket 210 may have a similar construction with reduced overall dimensions when compared to bracket 10. For example, bracket 10 may have a width of about four inches or more, for example, in the range of about 4 inches to about 7 inches. In one embodiment, the bracket 10 has a width of side 14 about 4.2 inches. The bracket 210 may then have reduced dimensions where for example the width of side 214 is about 3 inches or more, for example in the range of about 3 inches to about 5 inches.

Figure 5:
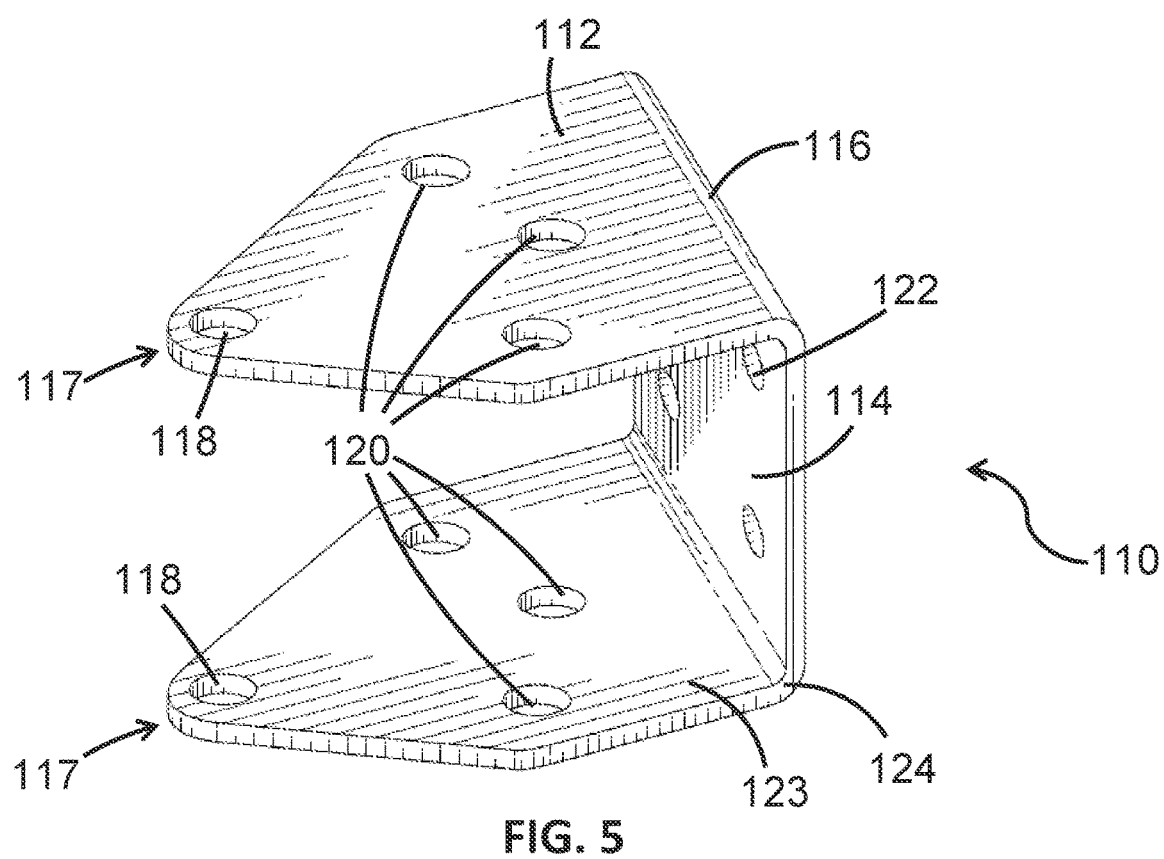
FIG. 5 is a front perspective view of the bracket of the embodiment illustrated in FIG. 5.

In the embodiment illustrated in FIGS. 4-5, a bracket 110 is of similar construction to the bracket 10 and includes a third side 123 to the bracket 110. The bracket 110 thus the bracket 110 comprises a first side 112 and a second side 114 where the first and second sides 112, 114 are connected by a bend or a corner such as a 90 degree bend 116. A third side 123 is then connected by a second bend or a second corner such as a 90 degree bend 124 to the second side 114. The first side 112 and third side 123 are generally parallel to one another and spaced apart and connected by the second side 114 extending therebetween. Thus, the overall shape of the bracket 110 is approximately a "U" shape.

Both the first side 112 and third side 123 have a similar overall shape and dimension as well as corresponding one or more apertures 118 therein. These apertures 118 are positioned for mounting of the bracket 110 to pivotally secure a trailer tongue to a boat trailer and the aperture positioning allows for selection of one or more apertures 118 for receiving a fastener there through. The apertures used are selected in part on the dimensions of the trailer and tongue. The apertures 118 in each of the first side 112 and third side 123 may be aligned such that a fastener and/or pivot pin may be received through corresponding apertures 118 on the first side 112 and third side 114.

The first side 112 may have a rectangular surface area extending from the bend 116 which then tapers to an apex 117 at the terminal end of the side 112. The second side 114 is rectangular or square as it extends a length away from the bend 116 towards the bend 124. The third side 123 then similarly has a rectangular surface area extending away from the bend 124 which then tapers into an apex 117 at the end of the side 124. The first side 112 and third side have the same or similar dimensions and the second side 14 may be a length extending between bends 116 and 124 the same or different than the length of the sides 112, 114 extending away from the bend 116, 124.

Additionally, one or more apertures 118 are provided in the first 112 or third side 123 for purposes of allowing for the pivoting of the tongue with respect to the trailer at the bracket 110. The apertures 118 are positioned to also allow for selection of an aperture 118 for receiving a pivot pin 118A there through and the aperture 118 selected in part on the dimensions of the trailer and tongue. Additional apertures 120 are provided for securing a position of the trailer portions connected at the pivoting joint via a pivot position securing mechanism 120A, such as a fastener 120A. The second side 114 may also be provided with one or more apertures 122 for receiving a securing a mechanism such as a bolt or the like, therethrough.

The brackets 10, 110 described here can be comprised of a metal such as steel or aluminum.

While the brackets 10, 110 are described for purposes of providing a pivoting joint to a boat trailer frame, such as along the trailer tongue, the bracket may be used to provide a pivoting joint along any trailer tongue or otherwise connecting two components together for forming a towable device. Moreover, the brackets 10, 110, can be used to secure separable components of a trailer tongue or frame, or components of a trailer tongue or frame that have been modified from a previously rigid or continuous unbending or non-pivoting state to provide a pivoting joint to an otherwise non-pivoting length of framework or trailer tongue.

In one embodiment, bracket 10 or 210 according to the disclosure herein has a first side 12, 212 that may be about 7.2 inches long and the second side 14 may be about 2.5 inches long. Thus, one or a pair of two brackets 10, 210 can be used to secure two lengths of trailer tongue together, regardless of the dimensions of the length of the trailer tongue being provided with the pivotal joint. The apertures on the first side 12 include a plurality of oblong shaped apertures 20 and round or circular shaped apertures 18. The circular shaped apertures 18 have a diameter of about 0.64 inches. The oblong apertures 20 can be described as having a capsule like shape or center rectangular area with arcuate terminal sections on two opposing ends where its largest length is about 1.14 inches. The apertures 22 on the second side 14 are round apertures 22 having a diameter of about 0.42 inches.

On the first side 12, two apertures 20 are aligned along the length of the first side 12 near the apex 17 and on a first axis where one oblong aperture 20 is spaced apart from the two apertures 20 along the same axis and aligned along said axis closer to the bend 16 than rounded apertures 20. Additional apertures 20 are positioned on either side of the centered oblong aperture 20 and aligned on a second and third axis respectively and which are angled away from the first axis at an angle of about 25.77 degrees when the axis extends from the center of the apex adjacent round aperture 18 to a center portion of the aperture 20 that is spaced about 3.89 inches from the apex adjacent aperture 18 and along the second axis.

In the embodiment illustrated in 6-7, one or more brackets 10, 110, 210 can be used to provide a pivoting joint to a trailer tongue alone or in combination with one or more coupling components 11. The brackets 10, 110, 210 can be secured to a section of trailer such as a trailer tongue and the coupling components 11 may be considered adaptors 11 optionally used to facilitate the pivoting connection of the two sections of trailer tongue 13a, 13b by the bracket(s) 10, 110, 210. Such an adaptor 11 may be fixedly secured via welding or otherwise integral to one or both portions of the trailer tongue for forming the pivoting joint. In the embodiment illustrated, the adaptor 11 has an overall tapered or triangular shape with a wider portion extended off of the trailer tongue 13b when installed, such that an overhang or wing is provided to allow for pivoting clearance for the trailer tongue portions 13a, 13b. A narrower portion of the adaptor 11 is fixedly secured to the trailer tongue 13b such that the narrow end may be substantially the same or less than in width than the trailer tongue 13.

Figure 6:
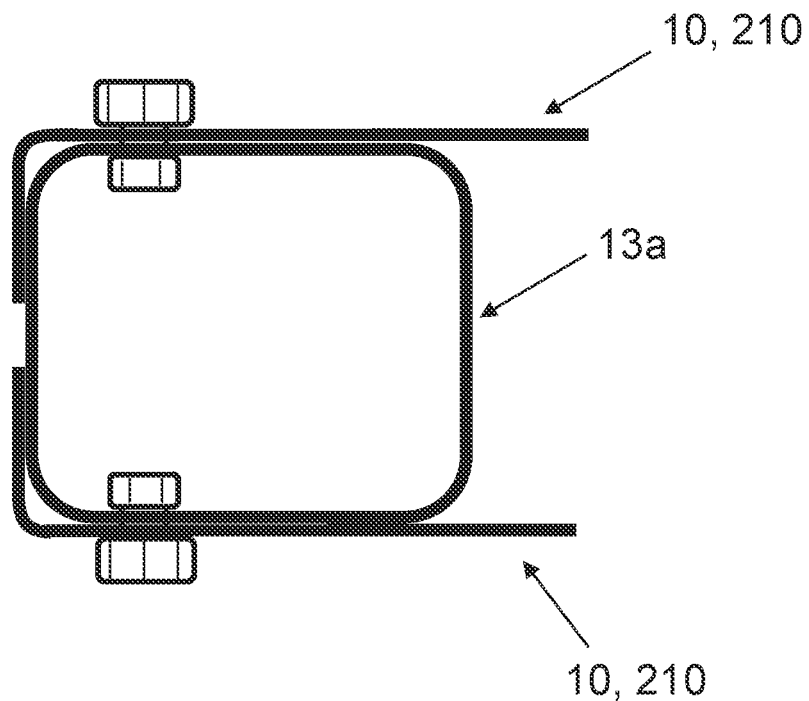
FIG. 6 illustrates the trailer tongue in a first position with a bracket secured thereto.
Figure 7:
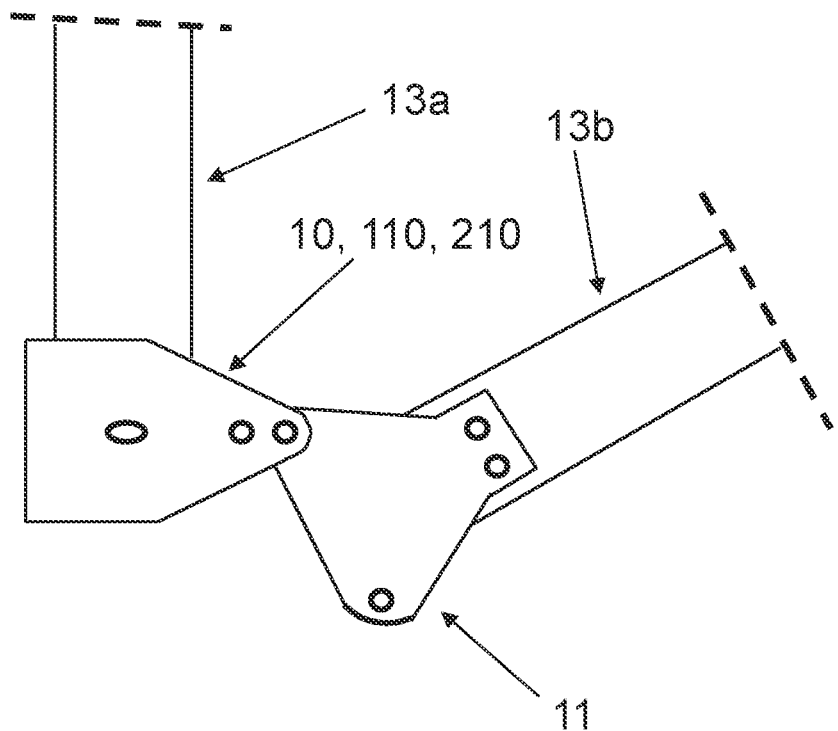
FIG. 7 is a front view of a pivoting connection formed by the bracket with the trailer tongue in a second, pivoted position.
Figure 9:
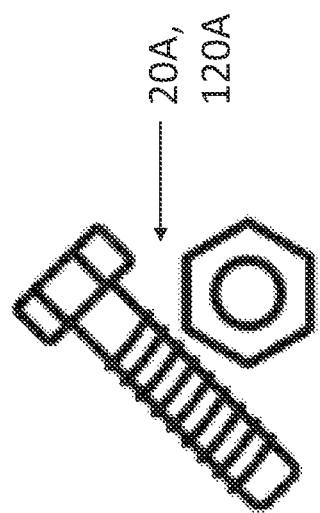
FIG. 9 is a side view of a fastener for securing the pivoting brackets according to one or more embodiments described herein.
Figure 8:
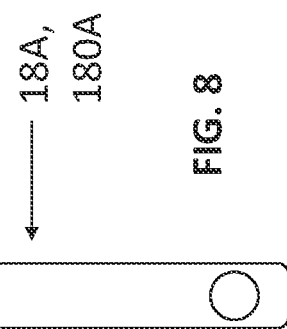
FIG. 8 is a side view of a pivot pin for the for the bracket according to one or more embodiments described herein.

In one installation, a first bracket 10, 210 is installed on a top of the trailer tongue 13a and a second bracket 10, 210 is installed on a bottom of the trailer tongue 13a, the brackets 10, 210 aligned and positioned at a terminal, open end of the trailer tongue 13a. When bracket 110 is used, only one bracket is required as the bracket 110 has a top and bottom surface for receiving the trailer tongue 13 there between. The brackets 10, 210 allow for adjusting the distance between the bracket 10, 210 in installation for use with nearly any trailer tongue 13 of varying sizes. A first coupling component 11 is then installed on a top of the trailer tongue 13b and a second coupling component 11 is installed on a bottom of the trailer tongue 13b, the coupling components 11 aligned and positioned at a terminal, open end of the trailer tongue 13b. The pivoting connection is provided by way of one or more pivot pins connecting vertically aligned pivoting apertures of the bracket(s) and the coupling component(s). Thus, the trailer tongue portions 13a and 13b are pivotable about the connection as illustrated in FIGS. 6 and 7.

When using any bracket configuration according to one or more embodiments herein, a pivot pin may be provided for securing through an aperture in the bracket and into the adaptor which is secured to the opposing section of trailer tongue for pivotal connection or the pivot pin may be passed through the bracket and through a portion of the trailer tongue or attachment mechanism on the trailer tongue. The additional brackets can be used to secure the pivoting joint in a selected position.

Although the present disclosure has been described with reference to preferred embodiments, workers skilled in the art will recognize that changes may be made in form and detail without departing from the spirit and scope of the disclosure.

The invention claimed is:

1. A bracket for providing a pivoting joint to a trailer tongue, the bracket comprising:
    a first surface having a plurality of first apertures therein and a second surface having a plurality of second apertures therein wherein the first surface and the second surface are connected by a 90 degree bend and wherein at least one of the plurality of first apertures is configured to receive a pivot pin therethrough and at least one of the plurality of first apertures are configured to receive a pivot position securing mechanism therethrough, and a third surface having a plurality of third apertures therein wherein a second 90 degree bend integrally connects the third surface to the second surface and wherein the plurality of third apertures are spaced apart on the third surface to align with one or more of the plurality of first apertures.

2. The bracket of claim 1 wherein in combination with a second bracket of identical construction, a marine accessory can be secured to the bracket and thus secured to the pivoting joint and wherein the marine accessory is a stair.

3. The bracket of claim 1 wherein the plurality of first apertures are linearly aligned along a length of the first surface of the bracket.

4. A system for providing a pivoting joint to a trailer tongue to selectively reduce an overall length of the trailer tongue comprising:
    one or more brackets having a first surface having a plurality of first apertures therein and a second surface having a plurality of second apertures therein wherein the first surface and the second surface are connected by a 90 degree bend and wherein at least one of the plurality of first apertures is configured to receive a pivot pin therethrough and at least one of the plurality of first apertures is configured to receive a pivot position securing mechanism therethrough and a third surface having a plurality of third apertures therein wherein a second 90 degree bend integrally connects the third surface to the second surface and wherein the plurality of third apertures are spaced apart on the third surface to align with one or more of the plurality of first apertures; and
    a coupling component for securing to a first section of trailer tongue and wherein the one or more brackets pivotally secure the first section of the trailer tongue to a second section of trailer tongue and wherein the coupling component has one or more apertures for aligning with one or more of the first apertures of the one or more brackets.

5. The system of claim 4 wherein a marine accessory can be secured to the second surface of the bracket and thus secured to the pivoting joint and wherein the marine accessory is a stair.

6. A method for providing a pivoting joint to a trailer tongue to selectively reduce an overall length of the trailer tongue comprising:
    providing at least one brackets having a first surface having a plurality of first apertures therein and a second surface having a plurality of second apertures therein wherein the first surface and the second surface are connected by a 90 degree bend and wherein one or more of the plurality of first apertures are configured to receive a pivot pin therethrough and one or more of the plurality of first apertures are configured to receive a pivot position securing mechanism therethrough and a third surface having a plurality of third apertures therein wherein a second 90 degree bend integrally connects the third surface to the second surface and wherein the plurality of third apertures are spaced apart on the third surface to align with one or more of the plurality of first apertures; and
    providing at least one coupling component for securing to a first section of trailer tongue and wherein the at least one brackets pivotally secure the first section of the trailer tongue to a second section of trailer tongue and wherein the at least one coupling component has one or more apertures for aligning with one or more of the first apertures of the bracket.

7. The method of claim 6 wherein the method further comprises modifying a trailer tongue by separating the tongue into two sections for insertion of the pivoting joint therebetween.

8. The method of claim 6 wherein at least one bracked further comprises two brackets and the at least one coupling further comprises two coupling components for providing the pivoting joint to the trailer tongue.

9. The method of claim 8 and further comprising:
    separating the tongue into two sections;
    installing one of the two brackets on a top surface of a first section of the trailer tongue and the second of the two brackets on a bottom surface of the first section of the trailer tongue;
    installing one of the two coupling components on a top surface of a second section of the trailer tongue and the second of the two coupling components on a bottom surface of the second section of the trailer tongue; and
    connecting at least one of the two brackets to at least one of the two coupling components with a pivot pin.

* * * * *